United States Patent
Zhong

(10) Patent No.: US 9,236,599 B2
(45) Date of Patent: Jan. 12, 2016

(54) LOW COST HIGH PERFORMANCE ELECTRODE FOR ENERGY STORAGE DEVICES AND SYSTEMS AND METHOD OF MAKING SAME

(71) Applicant: Linda Zhong, Oakland, CA (US)

(72) Inventor: Linda Zhong, Oakland, CA (US)

(*) Notice: Subject to any disclaimer, the term of this patent is extended or adjusted under 35 U.S.C. 154(b) by 164 days.

(21) Appl. No.: 13/780,502

(22) Filed: Feb. 28, 2013

(65) Prior Publication Data
US 2014/0238576 A1 Aug. 28, 2014

(51) Int. Cl.
| | |
|---|---|
| *H01G 13/00* | (2013.01) |
| *H01M 4/04* | (2006.01) |
| *H01G 11/38* | (2013.01) |
| *H01G 11/06* | (2013.01) |
| *H01G 11/28* | (2013.01) |
| *H01M 4/139* | (2010.01) |
| *H01G 11/46* | (2013.01) |
| *H01G 11/50* | (2013.01) |
| *H01M 4/88* | (2006.01) |

(52) U.S. Cl.
CPC ............... *H01M 4/043* (2013.01); *H01G 11/06* (2013.01); *H01G 11/28* (2013.01); *H01G 11/38* (2013.01); *H01G 13/00* (2013.01); *H01M 4/0404* (2013.01); *H01M 4/139* (2013.01); *H01G 11/46* (2013.01); *H01G 11/50* (2013.01); *H01M 4/88* (2013.01); *Y02E 60/122* (2013.01); *Y02E 60/13* (2013.01)

(58) Field of Classification Search
CPC ....... H01G 11/38; H01G 11/42; H01G 13/00; H01M 4/0404; H01M 4/0416; H01M 4/043; B29C 41/08
USPC .................................. 156/62.2, 242; 361/502
See application file for complete search history.

(56) References Cited

U.S. PATENT DOCUMENTS

| | | | | |
|---|---|---|---|---|
| 6,667,000 | B1 * | 12/2003 | Nakazato et al. ............. | 264/104 |
| 7,492,571 | B2 * | 2/2009 | Zhong et al. .................. | 361/502 |
| 7,791,860 | B2 * | 9/2010 | Mitchell et al. ............... | 361/502 |
| 8,213,156 | B2 * | 7/2012 | Mitchell et al. ............... | 361/502 |
| 2005/0250011 | A1 | 11/2005 | Mitchell et al. | |

(Continued)

OTHER PUBLICATIONS

International Search Report dated May 3, 2013 for PCT/US2013/028220 (6 pages).

*Primary Examiner* — Philip Tucker
*Assistant Examiner* — John Blades
(74) *Attorney, Agent, or Firm* — Procopio, Cory, Hargreaves & Savitch LP; Noel C. Gillespie

(57) ABSTRACT

The present invention is directed to a low cost, high performance electrode for energy storage devices and energy storage systems and a method for making same is disclosed, where a flexible binder is mixed with partial active and conductive materials in the electrode formulation and activated by mixing with a minimum amount of solvent it is then mixed with the remaining active and conductive materials and the binder is uniformly deposited on to the active and conductive particles by high speed mixing. The active and conductive particles deposited with activated binder particles are then pressed together to form free standing electrode film. High performance and low cost products, such as free standing electrode films, laminated electrodes, ultracapacitors, lithium-ion capacitors, batteries, fuel cells and hybrid cells which are the combination of the above devices, and the energy storage system or the system blocks, such as modules, can be manufactured using this process.

15 Claims, 2 Drawing Sheets

(56) References Cited

U.S. PATENT DOCUMENTS

| | | |
|---|---|---|
| 2006/0078798 A1 | 4/2006 | van Heuveln et al. |
| 2008/0089006 A1 | 4/2008 | Zhong et al. |
| 2009/0223630 A1* | 9/2009 | Mitchell et al. ............... 156/320 |
| 2009/0290288 A1* | 11/2009 | Mitchell et al. ............... 361/502 |
| 2009/0321678 A1 | 12/2009 | Zhong et al. |

* cited by examiner

LOW COST HIGH PERFORMANCE ELECTRODE FOR ENERGY STORAGE DEVICES AND SYSTEMS AND METHOD OF MAKING SAME

FIELD OF THE INVENTION

The present invention is directed to a low cost and high performance electrode for an energy storage device or an energy storage system and the method for making a low cost and high performance electrode for energy storage devices or an energy storage system. The types of energy storage devices that can incorporate such electrode include ultracapacitors, lithium ion capacitors, batteries, fuel cells and hybrid cells which are the combination of the above devices. The types of energy storage systems that can incorporate such a low cost and high performance electrode are the energy storage system that uses at least one of the above devices

BACKGROUND OF THE INVENTION

Although different types of energy storage devices are made by different electrodes, electrolytes and other materials, thus with different energy storage mechanisms, the basic constitutions and the fundamentals of the devices are more or less the same. One example is that every type of energy storage device, including ultracapacitors, lithium ion capacitors, batteries, and fuel cells and hybrid cells which are the combination of the above devices, need electrodes. Another example is that, in all of these devices, if an electrode is made thicker, it will store more energy but with less power. Another example is that, among all the critical components, electrode is one of the most important components in the energy storage devices. It plays a major role in determining the performance, the reliability or the field life, as well as the cost of the devices.

Energy density and power density are the most important performance characteristics for energy storage devices. In order to have high energy densities, electrodes need to be made with the highest amount of active materials per surface area or per volume. In the example of an ultracapacitor electrode, the more activated carbon is packed in the electrode, the higher capacitance the device will have, the higher energy density the device will provide. Therefore, a higher density electrode, i.e., with more active materials, is preferred. With a higher density electrode, it also promotes the direct and more contacts between the active material particles, the conductive material and active material particles, thus promoting the potential for greater electrical passes inside the electrode, thus improving the electrical conductivity and the power density of the electrode.

On the other hand, non-functional materials, such as binders and conductive carbon, do not add any capacitance or the energy to the electrode, thus should be used as minimum as possible. Due to the non-conductive nature of a binder, excessive usage of binders in the electrode will cause high electrical resistance in the device, thus lower the power density. Therefore, improving electrode packing density, and reducing nom functional material usage, are the most important ways to improve energy and power density of the electrodes.

Ultracapacitors store electrostatic energy in an electrode/electrolyte interface layer. At the electrode and electrolyte interface, a layer of ions is formed to balance the electrical charge on the electrode. The charge and discharge process is a pure physical process, there is no chemical reaction associated with the process and more importantly, to alter or degrade the materials. Therefore, the lives of the devices in the applications are theoretically supposed to be forever. However, in reality, there are always some undesired impurities in the device that cause chemical reactions during application, thus harm the device reliability and shorten the field life. The typical impurity in an Ultracapacitor is residue solvent in the electrode, or the impurities in the raw materials, especially in the activated carbon due to the excellent absorbing ability of the activated carbon.

Cost of an electrode is determined by the combination of the cost of the materials and the cost of manufacture. Less usage and cheaper raw materials, fewer manufacturing steps, less energy used in the manufacture process, high production through put and high yield of the manufacturing process are the main means to achieve a low cost energy storage product.

To make an electrode by a coating process, a solvent or an aqueous solution or both, is used to dissolve binders, followed by mixing the binder solutions with other powder materials to form slurry. The most widely used solvent in the battery, lithium-ion capacitor, Ultracapacitor and hybrid cell electrode manufacture process is N-methylpyrrolidine, also known as NMP. The typical percentage of solids in the slurry is 15-20%. And the typical binder content in the total powder content is 3-6% and up to 15% to get the strong electrodes. The slurry is then coated onto a treated or non-treated current collector by a cylindrical roller. The current collector along with the coating layer is passed through a long dryer, where the solvent is dried and removed from the electrode.

The problems associated with the coated electrodes are: Problem #1—since the binder is dissolved in a solution and it flows into active materials to block the active material surfaces, this reduces the active materials functionality and also increases the devices resistivity, thus resulting in reduced device energy and power density; and Problem #2—there is always a residue from the solvent in the coated electrode due to large amount of solvent soaked in the electrode materials during the manufacturing process. Solvent such as NMP is very difficult to be dried and removed. Therefore, an electrode made by a conventional coating method does not provide a long life energy storage device.

Other related problems include: Problem #3—solvent added to the electrode formulation needs to be removed. And, there is large amount of energy needed to dry and remove the solvent, which adds an additional cost to the manufacture of the product.

Finally, yet another problem that exists is: Problem #4—since the binder used is dissolvable in solvents by nature, the binder will be dissolved into the electrolyte chemically or electrochemically sooner or later, the particles in the electrode eventually lose contact to each other or to the current collector, and this inevitably leads to early energy storage device failure.

To make an electrode by an extrusion process, a solvent, normally with high lubricating quality, is added to a powder mixture, followed by an extensive mixing using a screw extruder or some other extruder. During the mixing and forward pushing process, large shear force is applied to the powder mixture, where the binder is fibrilized and it connects the other particles together. The typical percentage range of solids in the extrusion electrode formulation is 40%-60%. And the typical binder content in the total powder content is 10-15%. The extruder forced well mixed materials out from the exit and an electrode film is formed by a calendar or multiple calendar stations to the required thickness. The film passes through a long dryer to dry and remove the solvent.

The extrusion process for making an electrode does not have problems #1 where the binder flows into active materials to block the active material surfaces as much, and Problem #4 where binder will be dissolved into the electrolyte chemically or electrochemically sooner or later, as listed and outlined above in coating process, but maintains the problems associated with Problem #2 where there is always a residue from the solvent, since the lubricating solvents are normally very difficult to be dried out, and Problem #3 that a large amount of energy is needed to dry out the added solvent. In addition, new problems occur in the extrusion process. Problem #5, a high capital investment. The extrusion equipment along with the calendars followed by long dry ovens is very expensive and the manufacture process is very complicated, therefore, the cost to make an extruded electrode is very high.

Another new problem, problem #6, that is, a higher percentage of the binder has to be used to make a strong enough electrode film which associates two new problems: Problem 6A—less active materials can be added to the electrode formulation, thus lower energy density of the device; and Problem 6B—this larger amount of binder blocks the surface area of the active materials, further lowering the energy density of the device, and Problem 6C—this larger amount of binder blocks the electrical flow between the active material particles, thus increased resistance and reduced power density for the device.

To make an electrode by a dry process, powders were dry mixed and subjected to an extensive mixing, where the binder is fibrilized and forming a matrix to support the other particles to form an electrode film. The dry process solved all four problems associated with the coating process, and the problem #5 in the extrusion process however, it carried over extrusion process's problem #6, which is it needs a large quantity of the binder to support and to make a strong enough electrode film with adequate film density.

Aiming to make a high performance electrode for energy storage device and energy storage system, in U.S. utility patent application Ser. No. 13/780,365 a binder activation method is proposed. Powders, including active materials, conductive materials and binder are mixed together. Certain types of solvent or solvent mixture is added and slowly mixed with the powder mixtures, where the binder is activated by the solvent or solvent mixture. The binder is then deposited on to the active and conductive materials by a high speed mixer. A free standing electrode sheet or film can be made by pressing the mixed materials and an electrode can be made by laminating the sheet or film on to a treated/non-treated current.

This binder activation method reduces the binder usage more than half comparing to extrusion and dry process methods. The activated binder is more effective, provides higher binding forces for the active materials and promotes higher adhesion for the electrode materials. Thus less binder is needed in the electrode formulation.

Significant binder usage reduction largely improves electrode capacitance, dramatically reduces electrical resistance, thus improves both energy and power density.

Although a high performance electrode is made by the binder activation method, a considerable amount of solvent is needed in order to activate the binder, where the binder is mixed with all the active materials and the conductive materials, thus the total cost to make the electrode is comparable to the electrode that is made by dry method, although only less than half amount of binder is used in the binder activation method. In U.S. utility patent application Ser. No. 13/780,365 an alternative method was proposed, where the binder is activated first before mixing with the active materials, therefore, minimum amount of solvent is needed. However, there exists a potential technical problem in this alternate method. That is, since the solvent is added directly to the binder, binder may be over soaked by the solvent forming binder agglomerates during the binder activation and deposition process, which leads to a non-uniform binder distribution within the electrode film.

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

SUMMARY OF THE INVENTION

The principle advantage of this invention is that the resulting energy storage devices have a significant performance advantage yet the cost to make such electrode is significantly reduced over prior an methods. This is due to the following factors:
 (a) the usage of the solvent used to activate the binder is significantly reduced comparing to binder activation method in U.S. utility patent application Ser. No. 13/780,365;
 (b) the solvent is highly vaporizable such that no drying process is needed as in most prior art methods; and
 (c) less than half of the binder is needed comparing to prior art extrusion and dry process methods.

Another advantage of this invention is it results in energy storage devices with high energy, because a higher packing density electrode is formed and/or minimum amount of binder is used, and the greatest amount of active material can be incorporated.

Another advantage of this invention is as a result of the inventive process the binder is blocking the active material surface area much less, which also acts to increase the energy storage capability significantly.

Another advantage of this invention is that the expected increase/improvement of the energy output of an energy storage device made with the process of this invention over the prior art extrusion and dry process is greater than 10%.

Another advantage of this invention is that the expected increase/improvement of the energy output of an energy storage device made with the process of this invention over the prior art coating method is greater than 25%.

Another advantage of this invention is that the process results in energy storage devices with significantly higher power because less binder is used which significantly reduces the blocking of electrical flow between the particles.

Another advantage of this invention is that the process also promotes the direct and more contacts between the active material particles or the conductive material and active material particles due to higher packing density, thus promoting the potential for greater electrical passes inside the electrode.

Another advantage of this invention is that the ESR of the energy storage devices is greatly reduced, wherein the expected improvement of the power output of this invention compared to prior art processes are: to extrusion and dry process it is larger than 20%; and to the prior art coating method it is larger than 30%.

And yet another advantage of this invention is the resulting energy storage devices have significantly longer life, since the solvent used in the process is a minimal amount (especially if using the first alternate embodiment example process is used), and also the solvent selected is highly vaporizable, the residue solvent in the electrode is minimal to non-existent, especially if/when the electrode is subject to a vacuum heating in the device manufacture process which is widely used in the energy storage industry.

Therefore, in summary, the present invention provides a more efficient manufacturing method of making high performance, high reliability/long field life and most importantly, low cost electrodes for energy storage devices and systems. The current invention uses a flexible binder. The flexible binder is mixed with partial active and conductive materials in the electrode formulation and activated by mixing it with minimum amount of solvent; it is then mixed with the remaining active and conductive materials and the binder is uniformly deposited on to the active and conductive particles by high speed mixing. The active and conductive particles deposited with activated binder particles are then pressed together to form free standing electrode film. High performance and low cost products, such as free standing electrode films, laminated electrodes, ultracapacitors, lithium ion capacitors, batteries, fuel cells and hybrid cells which are the combination of the above devices, and the energy storage system or the system blocks, such as modules, can be manufactured using this process.

While the process methods can vary, one example of the process steps of the present invention include the following, wherein all percentages below equal a weight percent:

Step 1: Determine the powder mixture formulation which includes active materials, conductive material additives, and the binder. The working ranges for each include 70-97% for the active materials, 0-10% for the conductive material additives, and 2-20% binder material. The optimal ranges include 88-96% for the active materials, 0-2% for the conductive material additives and 4-12% for the binder material. Determine the amount of the each materials: Mac is the total weight of active materials, Mcc is the total weight of conductive materials, and Mb is the total weight of the binder.

Step 2 Binder activation: Slowly mix partial active and conductive materials with the binder. The percentage of the active and conductive materials to be mixed with the binder is 0-50% Mac and 0-100% Mcc and 100% Mb. Binder activation by adding and mixing the solvent to the powder mixture. Keep the powder mixture to solvent ratio between 1:0.2 to 1:10 and the optimal powder mixture to solvent ratio range is 1:1 to 1:4.

It must be pointed out that adding more than 50% of Mac to the powder mixture is workable, but it will require more solvent to activate the binder and will increase the manufacture cost yet does not improve the electrode performance. In fact, it is desirable that the minimum amount of the active and conductive materials should be mixed at this stage in order to use the minimum amount of solvent. The total amount of active and conductive materials should be just enough to prevent the solvent and binder direct and over interacting such that the binder agglomerates are not funned during the activation step. It is also pointed out that using less than 100% Mb here is workable, but not desirable. In order to take advantage of the enhanced adhesion capability, the greatest amount of binder should be activated.

It is also noted that a high solvent amount is workable, but not desirable, since more solvent than the powder mixture to solvent ratio of 1:10 will not improve the electrode performance, but rather a waste of the solvent materials or add a waiting time for excess solvent to evaporate.

Step 2: Add the remaining active materials and the conductive materials into the mixture, mix by a high speed mixer.

Step 3: Press the mixed materials into a sheet or a free standing film.

Step 4: Laminating the sheet or film on to a ate& or non-treated current collector to form the electrode.

It must be clearly understood at this time although the preferred embodiment of the invention consists of a more efficient manufacturing method of making high performance, high reliability/long field life and cost effective electrodes for energy storage devices, many numerous configurations and combinations of materials can be used that will achieve a similar operation and they will also be full covered within the scope of this patent.

With respect to the above description then, it is to be realized that the optimum physical and chemical relationships for the parts of the invention, to include variations in size, materials, shape, form, chemistry, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE DRAWINGS

The accompanying drawings, which are incorporated in and form a part of this specification, illustrate embodiments of the invention and together with the description, serve to explain the principles of this invention.

DETAILED DESCRIPTION OF THE PREFERRED EMBODIMENTS

Figure 1:
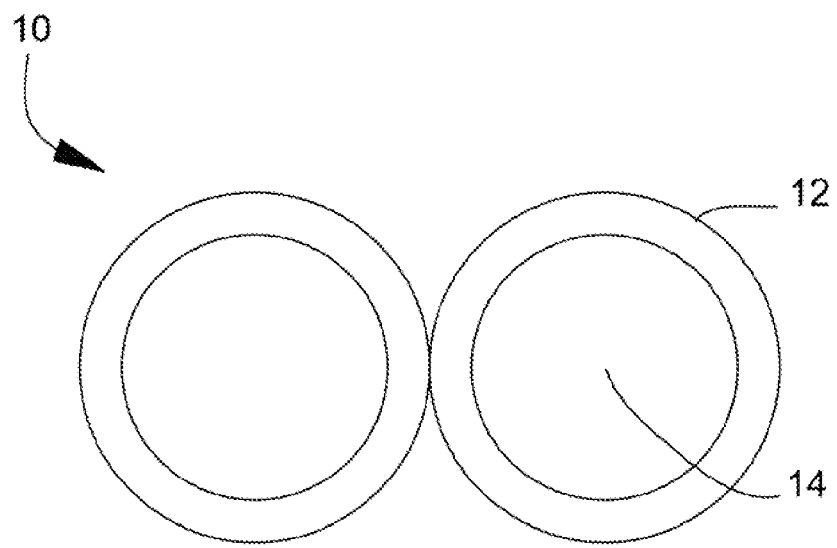
FIG. 1 depicts the structure of a prior art electrode made using the conventional coating process and illustrating the relationship between the active material particles and the binder layer.

For a fuller understanding of the nature and objects of the invention, reference should be made to the following detailed description taken in conjunction with the accompanying drawings wherein similar parts of the invention are identified by like reference numerals.

Referring now to the drawing figures, there is seen in FIG. 1 an illustration of the structure of a prior art electrode made using the conventional coating process and illustrating the relationship between the active material particles and the binder layer. Here is shown the relationships between the prior an electrode structure made by coating process 10, the binder layer 12, which acts as an insulation layer, and the active material particle 14.

Figure 2:
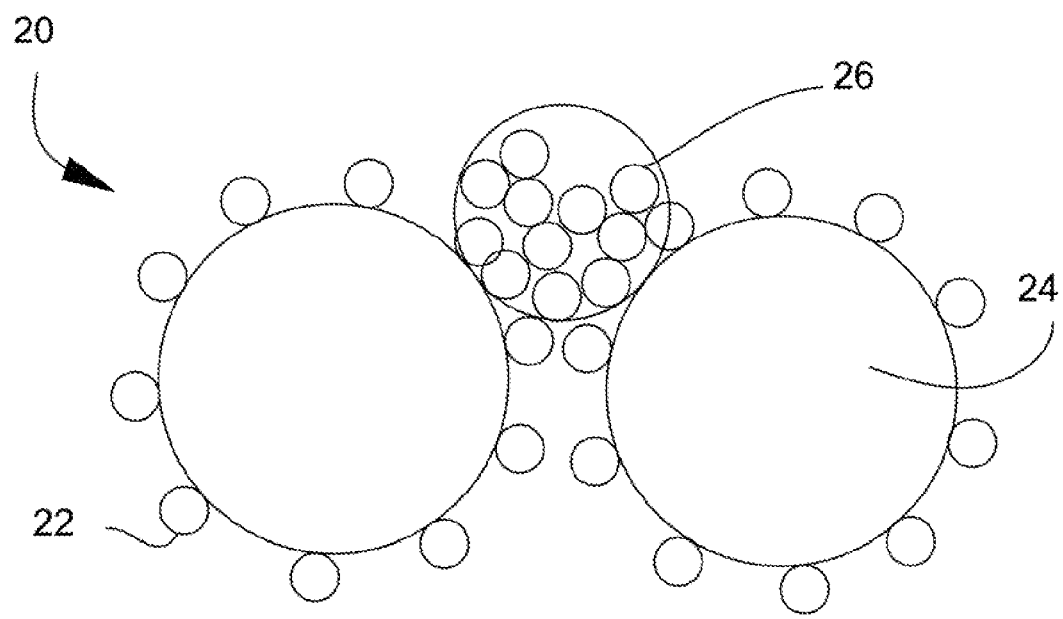
FIG. 2 depicts the structure, of a prior art electrode made using the conventional extrusion process and illustrating the relationship between the active material particles and the binder particles.

FIG. 2 depicts the structure of a prior art electrode made using the conventional extrusion process and illustrating the relationship between the active material particles and the binder particles. Here is shown the relationships between the prior art electrode structure made by extrusion process 20, the binder particles 22, the active material particles 24, and more clearly detailing the clustered and wasted binder occupying extra space 26.

Figure 3:
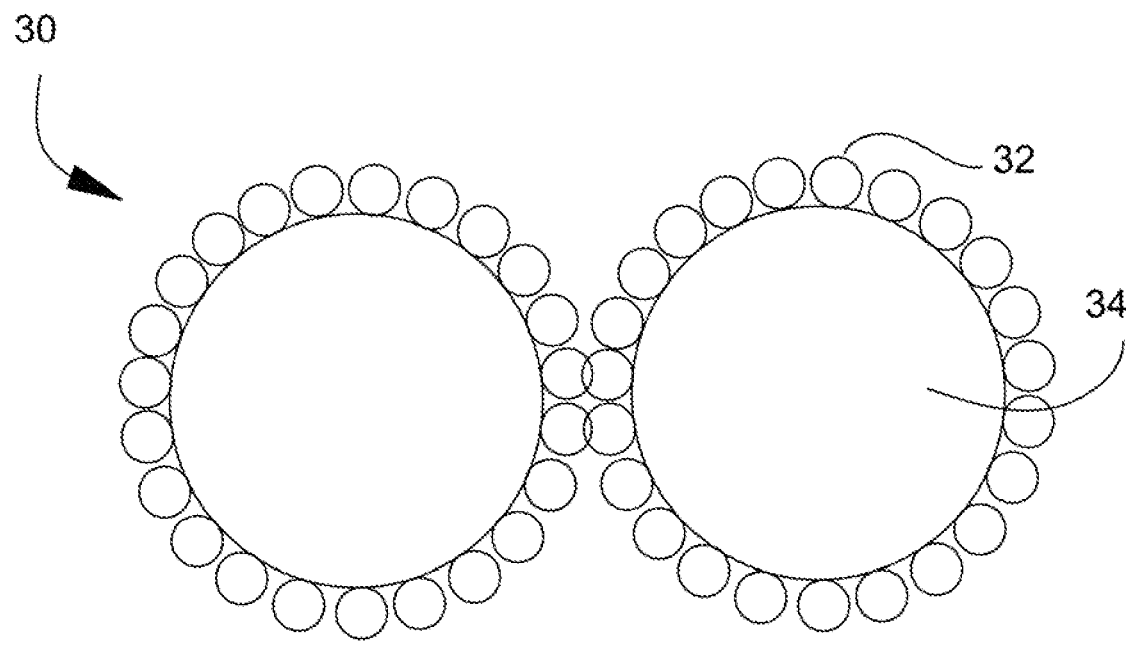
FIG. 3 depicts the structure of a prior art electrode made using the conventional dry process and illustrating the relationship between the active material particles and the binder particles.

FIG. 3 depicts the structure of a prior art electrode made using the conventional dry process and illustrating the relationship between the active material particles and the binder particles. Here is shown the relationships between the prior art electrode structure made by dry process 30, the binder particles 32, showing how extra binder particles are necessarily needed due to lower adhesion to the active material particles 34.

Figure 4:
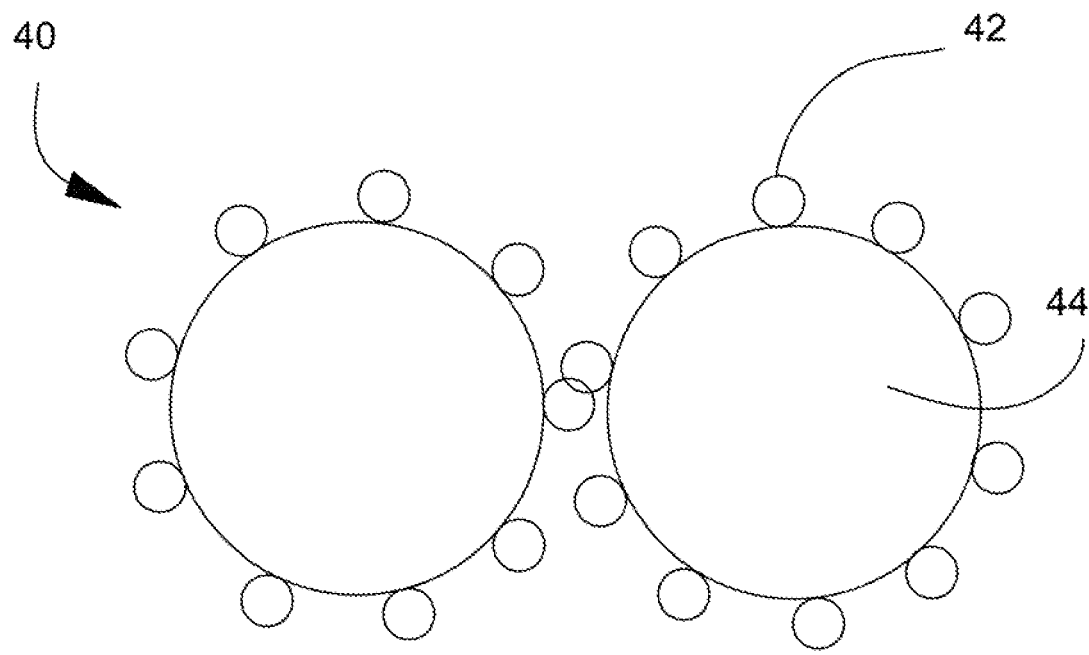
FIG. 4 depicts the structure of an electrode made using the present inventive method and illustrating the relationship between the active material particles and the binder particles, according to the present invention.

FIG. 4 depicts the structure of an electrode made using the present inventive method and illustrating the relationship between the active material particles and the binder particles, according to the present invention. Here is shown the relationships between the electrode structure made by the present inventive process 40, the binder particles 42, wherein fewer binder particles are needed due to higher adhesion to the active material particles 44, showing a much greater exposed working surface area.

The active material could be any active materials commonly used for electrodes in ultracapacitors, Lithium ion capacitors, batteries, fuel cell and hybrid cells, which are the combination of the above devices, such as activated carbon for ultracapacitors electrodes, manganese dioxide or other metal oxide for ultracapacitor or battery electrodes, intercalated carbon, hard carbon or activated carbon for Li-ion capacitor or Li-ion batteries and many other like materials.

The conductive carbon may be graphite, the carbon black, hard carbon or low level activated carbon, and metal particles.

The meaning of a flexible binder is that the binder can be formed into a sheet or a film materials subject a press force only. One example of such binder is some fluoropolymer, such as Teflon, or PTFE. The binder is also activatable by mixing with certain solvent or solvent mixture, such that the adhesion capability of the binder to other materials is improved.

The selected solvent needs to have the capability to activate the selected binder, so that the binder improves its adhesion strength upon interacting with the solvent. The solvent also needs to be highly vaporizable such that no follow on drying process is necessary to remove the solvent afterwards. Examples may be hydrocarbons, low boiling point solvents, acetates, alcohols, glycols, acetone, DMC, ethanol, methanol, DEC, etc., or a solvent mixture includes two or more above solvents.

Powder mixing can be done by any kind of mixing equipment for mixing powders. Examples may be roller tanks, different types of conventional blenders, kitchen mixers, conventional mixers for mixing cement materials, conventional mixers for mixing medical materials, etc.

Activation of the binder can be done by any kind of mixing equipment, preferably a slower speed mixer or by hand if the quantity is not too large. Since the solvents used are highly vaporizable, slower speed mixer will promote less vaporization and give enough time for the solvent to be interacted with the binder.

Deposition of the binder onto active materials particles can be done by using a high speed grinder, a high speed blender or a high speed mixer. A medical grind is ideal for a batch binder deposition process. A food grinder used in breaking the dried beans is a good option. A Waring™ blender, or a jet mill, either horizontal or vertical type, can be used in this process. Industrial high speed mixer will be ideal to process large quantity materials.

Press of the particles can be done by a high pressure presser to make electrode sheets, or by roll mills or a calendar and followed by calendaring to make continuous films. Multiple calendaring processes can be used to adjust the final electrode film thickness.

With minimum solvent used to activate the binder, electrode with higher packing density, more active materials and less binder per volume is made with this invention. A higher performance and low cost electrode is thus made and performance comparison is shown in Table 1. Different T cell Ultracapacitors with 1 cm2 electrode area were made. The performance with different electrode made by the prior art electrode manufacture methods and the low cost binder activation electrode method, where all the electrodes are with the same thickness, 85+/−3 um, were compared, and the comparison results are in Table 2. It is clear, with only half amount of the solvent used, the Ultracapacitors made with the current invented electrode, which is the low cost binder activation method, achieved same or slightly better electrical performance than the Ultracapacitors using the electrode made by the prior art binder activation method.

Table 1 below illustrates the electrode formulation and performance comparison chart between the prior art electrode manufacture methods and the low cost binder activation method.

TABLE 1

| | Binder to total powder % | Negative impact of the Binder to the acitve materials | % solids in the solution | Solvent needed | Energy needed to dry out solvent | Residue solvent from dried electrode | Adhesion property | Summary |
|---|---|---|---|---|---|---|---|---|
| Coating | 3-6, upto 1 | Block pores & surface area | 20-30 | Yes | Yes | Yes | Weak carbon to carbon | Low performance Short life High cost |
| Extrusion | 10-15 | Occupy too much space | 40-60 | Yes | Yes | Yes | Weak film to Al | Low performance Short life High cost |
| Dry process | 10-15 | Occupy too much space & Block surface | 100 | No | No | No | Good cohesion & adhesion | Low performance Long life Low cost |
| Binder activation method | 3-12 | Minimum to no | 60-95 | Yes | No | Minimum to no | Strong cohesion & adhesion | High performance Long life Low cost |
| Current invention: Low cost binder activation method | 3-12 | Minimum to no | 80-97 | Yes | No | Minimum to no | Strong cohesion & adhesion | High performance Long life Lowest cost |

Table 2 below illustrates the T cell performance comparison (1 cm2 electrode area) with different electrode made by the prior art electrode manufacture methods and the low cost binder activation electrode method, where all the electrodes are with the same thickness, 85+/−3 um.

TABLE 2

|  | C (F) | ESR (ohm) | RC (s) |
|---|---|---|---|
| Coated method (12% binder, 81% solvent) | 0.28 | 3.73 | 1.03 |
| Dry process method (12% binder, 0% solvent) | 0.29 | 2.52 | 0.73 |
| Binder activation method (6% binder, 28% solvent) | 0.32 | 1.78 | 0.56 |
| Current invention: Low cost activation method (6% binder, 10% solvent) | 0.33 | 1.75 | 0.58 |

The low cost, high performance electrode for energy storage devices and systems and method of making same shown in the drawings and described in detail herein disclosed arrangements of elements of particular construction and configuration for illustrating preferred embodiments of structure and method of operation of the present application. It is to be understood, however, that elements of different construction, chemistry, configuration and other arrangements thereof, other than those illustrated and described may be employed for providing a low cost, high performance electrode for energy storage devices and systems and method of making same in accordance with the spirit of this disclosure, and such changes, alternations and modifications as would occur to those skilled in the art are considered to be within the scope of this design as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A method for making an electrode for an energy storage device, the method comprising:
   a) providing powder materials including active material particles in a working range of about 70-97 weight percent, conductive material additives in a working range of about 0-10 weight percent, and binder material in a working range of about 3-8 weight percent;
   b) activating the binder material by:
      i) mixing about 0.1-50 weight percent of the total amount of said active material particles and said conductive material additives with said binder material forming a binder mixture;
      ii) adding and mixing a highly vaporizable solvent to the binder mixture from i) at a binder material to solvent ratio in a range of about 1:0.2 to 1:2;
      iii) adding any remaining active material particles and conductive material additives into the mixture from ii) and mixing all of said added materials using a high-speed mixer;
   c) forming a film by pressing the mixed materials into a sheet; and
   d) laminating the sheet on to a current collector to form the electrode.

2. The method of making an electrode for an energy storage device according to claim 1, wherein said providing powder materials comprises providing active material particles in a range of about 88-96 weight percent.

3. The method of making an electrode for an energy storage device according to claim 1, wherein said providing powder materials comprises providing conductive material additives in a range of about 0-2 weight percent.

4. The method of making an electrode for an energy storage device according to claim 1, wherein said activating the binder material comprises mixing 0.1-0.5 weight percent of the total amount of said active material particles and said conductive material additives with said binder material.

5. The method of making an electrode for an energy storage device according to claim 1, wherein said activating the binder material comprises mixing about 0.1-50 weight percent of the total amount of said active material particles with zero weight percent of said conductive material additives before mixing with said binder material.

6. The method of making an electrode for an energy storage device according to claim 1, wherein said activating the binder material comprises mixing a partial amount of said conductive material additives.

7. The method of making an electrode for an energy storage device according to claim 1, wherein said forming a film comprises pressing the mixed materials into a free-standing sheet.

8. The method of making an electrode for an energy storage device according to claim 1, wherein said laminating the sheet comprises laminating the sheet onto one of a treated and non-treated current collector to form the electrode.

9. The method of making an electrode for an energy storage device according to claim 1, wherein said electrode is used in the manufacturing of an ultracapacitor.

10. The method of making an electrode for an energy storage device according to claim 1, wherein said electrode is used in a lithium-ion capacitor.

11. The method of making an electrode for an energy storage device according to claim 1, wherein said electrode is used in a battery.

12. The method of making an electrode for an energy storage device according to claim 1, wherein said electrode is used in a fuel cell.

13. The method of making an electrode for an energy storage device according to claim 1, wherein said electrode is used in a hybrid cell.

14. The method of making an electrode for an energy storage device according to claim 1,
   wherein said electrode is used in an energy storage system comprising system blocks and modules, and
   wherein at least one of said energy storage system blocks and modules includes said energy storage device comprising said manufactured electrode.

15. The method of making an electrode for an energy storage device according to claim 1, wherein the highly vaporizable solvent is one of acetate, alcohol, glycol, acetone, dimethyl carbonate (DMC), ethanol, methanol, diethyl carbonate (DEC), and combinations of two or more thereof.

* * * * *